June 12, 1956 — G. A. ELDRED — 2,749,956
PORTABLE WATER TANK
Filed July 23, 1954 — 2 Sheets-Sheet 1
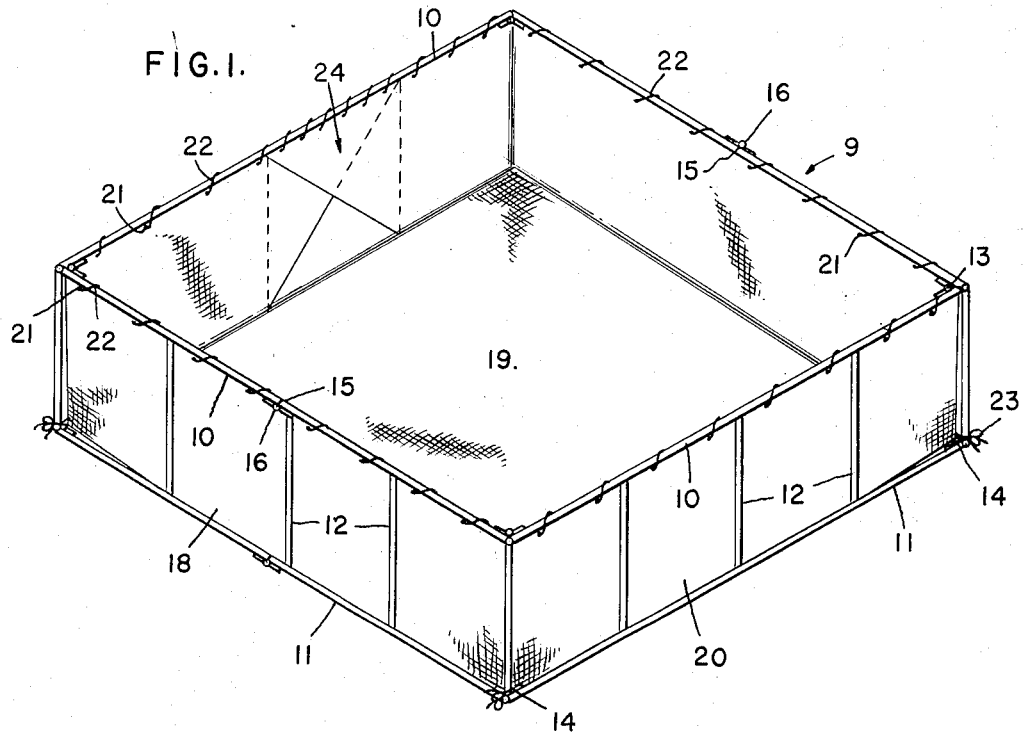
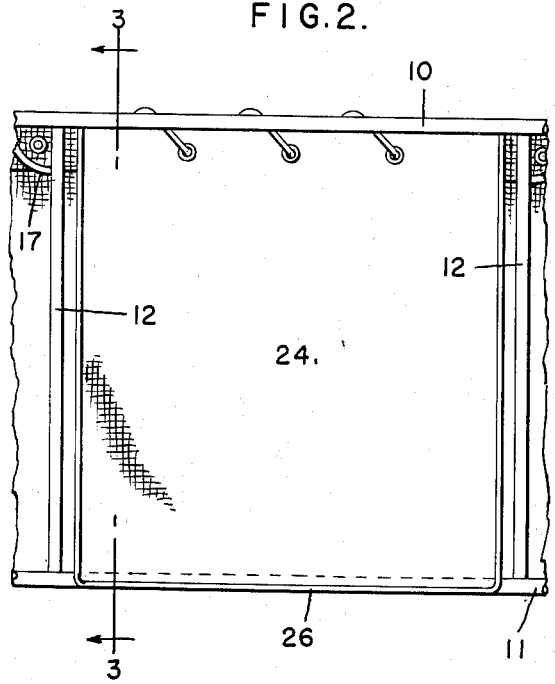
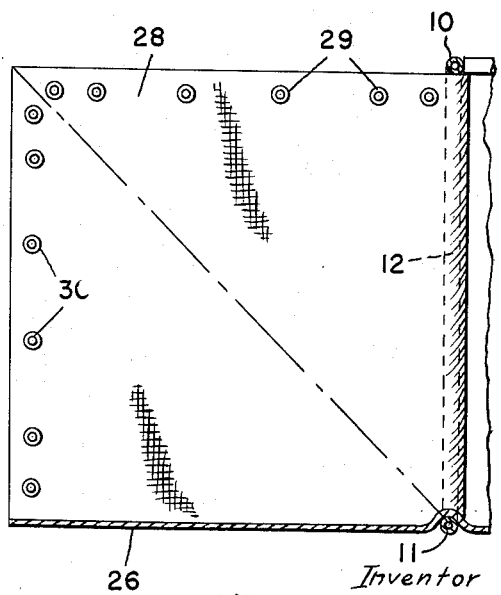
Inventor
Giles A. Eldred
By B. J. Darwey
ATTY.

June 12, 1956  G. A. ELDRED  2,749,956
PORTABLE WATER TANK
Filed July 23, 1954  2 Sheets-Sheet 2

Inventor
Giles A. Eldred
By B. F. Darwe
ATTY.

United States Patent Office 2,749,956
Patented June 12, 1956

2,749,956
PORTABLE WATER TANK
Giles Arthur Eldred, Rock Island, Ill.

Application July 23, 1954, Serial No. 445,258

3 Claims. (Cl. 150—.5)

This invention relates generally to a water tank and more particularly to a water tank which is collapsible to facilitate transportation.

In sparsely populated areas where there are no hydrants or other direct sources of water for fighting fires, it is necessary for a water supply to be carried to the scene of the fire, along with the fire fighting equipment. A tank truck from which water is pumped and played on the fire has heretofore been employed for this purpose. This system is satisfactory for small fires requiring a relatively small amount of water to extinguish the blaze, but is unsatisfactory in case of larger fires demanding more than one tank of water. It is the principal object of this invention therefore, to provide a collapsible water tank adapted to be carried to the scene of a fire, from which tank water is drawn to fight the fire, the tank being successively refilled by a tank truck which shuttles back and forth from a source of water to the portable tank, until the fire is extinguished.

Another object is to provide a water tank of the character described which is economical to construct and may be easily and quickly erected.

A further object is to provide a collapsible tank having a spillway for emptying the contents of the tank when no longer needed, the spillway including improved closure means to prevent the seepage of water from the tank.

Other objects of the invention will be apparent from the following description of the present preferred form of the invention, taken in connection with the accompanying drawings, wherein:

Fig. 1 is a perspective view of the water tank of the present invention;

Fig. 2 is a fragmentary side elevational view of the same, showing to advantage the spillway forming a part of the present invention, the spillway being shown in open position;

Fig. 3 is a sectional view taken along the line 3—3 of Fig. 2, looking in the direction of the arrows;

Figure 6:
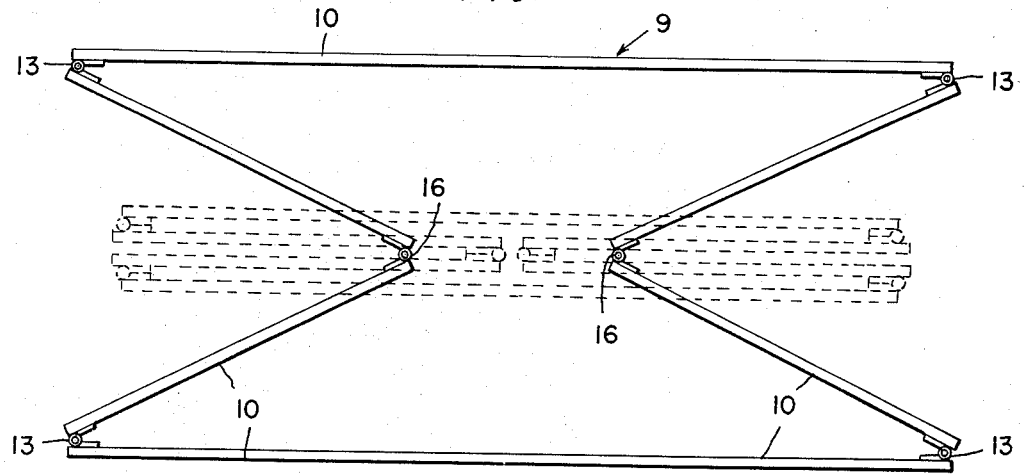
Fig. 6 is a top plan view of the collapsible frame forming a part of the present invention, the frame being shown fully collapsed in dotted lines.
Figure 7:
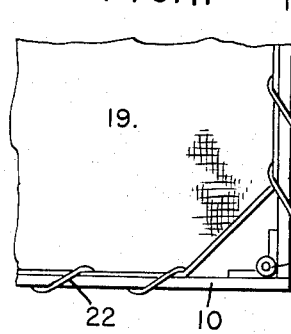
Fig. 7 is a fragmentary top plan view of the water tank showing to advantage the corner construction thereof.
Figure 8:
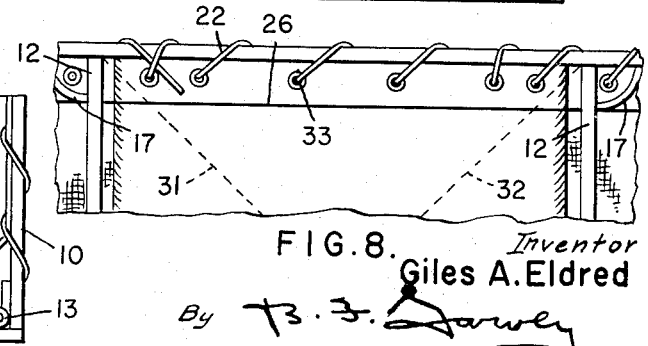
Fig. 8 is a fragmentary side elevational view of the spillway forming a part of the present invention, showing the spillway in closed position.

Referring now in greater detail to the drawings, the numeral 9 generally designates a substantially square supporting frame. Frame 9 includes four side members of equal length, each of which comprises upper horizontal bars 10 and lower horizontal bars 11, spaced in parallel relation by vertical members 12. Adjacent upper horizontal bars 10 are hinged together, as indicated at 13 and lower horizontal bars 11 are hinged at 14 to permit relative movement of the bars. The upper and lower horizontal bars 10 and 11 of two opposed sides of square frame 9 are severed at their mid-point as indicated at 15, the two sections being connected by a hinge 16. Hinges 16, in conjunction with hinges 13 and 14 in the corners of frame 9, permit the collapse of the latter in the manner shown to advantage in Fig. 6. Frame 9 is further provided with a plurality of rope anchors 17 extending at an angle from vertical members 12 to upper horizontal members 10.

The receptacle or body portion of the tank is generally designated at 18 and comprises a bottom 19 and four sides 20 made of canvas or other flexible, waterproof material. The upper margins of sides 20 are provided with a plurality of grommets 21 adapted for the reception of rope or like material 22 which is laced through the grommets and spirally wound around upper horizontal members 10. Rope 22 may be of one piece, or a plurality of rope sections, the terminals of which are secured to anchors 17. The lower corner members of receptacle 18 are secured to the corner vertical members 12 of frame 9 by ties 23. By means of this structure, receptacle 18 is firmly held contiguous with frame 9.

Figure 4:
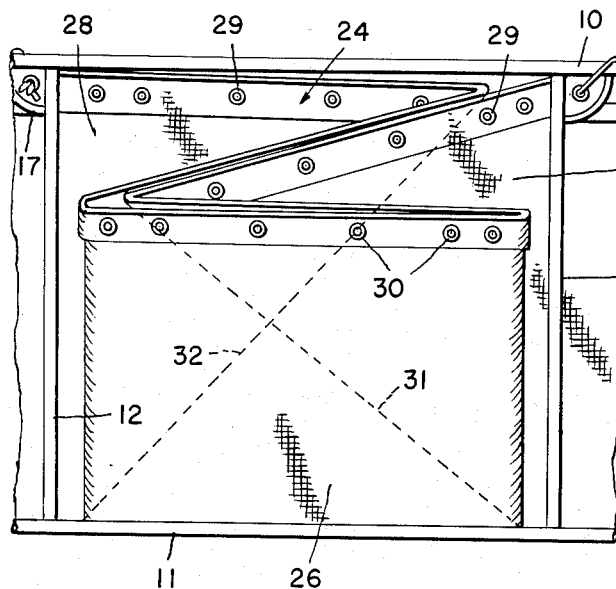
Fig. 4 is a fragmentary side elevational view similar to Fig. 2, showing the spillway partially open.
Figure 5:
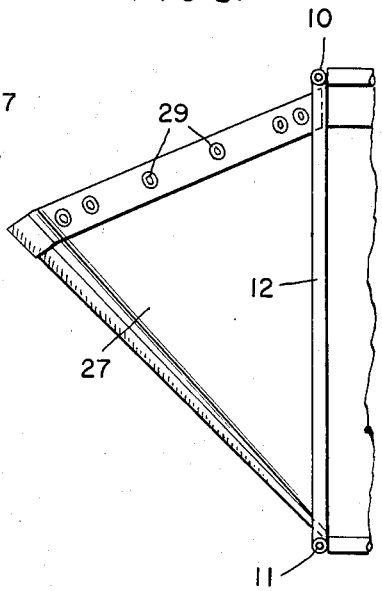
Fig. 5 is a fragmentary end elevational view of the same.

In order to permit emptying of water from the portable tank, one side thereof has a spillway 24. Spillway 24 is preferably formed from a single piece of waterproof fabric such as canvas, which is folded and secured to side 20 in a manner to provide a bottom 26 and sides 27 and 28, all three of which are square and of equal area. As shown in Fig. 3, sides 27 and 28 are provided with a horizontal row of grommets 29 and a vertical row of grommets 30 located along the margins of two sides thereof. When spillway 24 is moved from 'open' to 'closed' position by raising bottom 26 upwards towards receptacle side 20, sides 27 and 28 are folded back upon themselves along diagonal lines 31 and 32 respectively. Sides 27 and 28 assume a triangular shape and lie across the entrance of spillway 24 (see Fig. 4). The horizontal rows of grommets 29 and vertical rows of grommets 30 of sides 27 and 28 are aligned at this time. Also, a horizontal row of grommets 33 located along the outer margin of bottom 26 are aligned with grommets 29 and 30 of sides 27 and 28. Rope 22 is then trained through the aligned grommets and spirally wound about upper horizontal bar 10 to retain the spillway in closed position. The terminals of rope 22 are then secured to any convenient anchor 17.

In use, the water tank of the present invention is carried to the scene of the fire, in collapsed condition, where it is opened and filled with water carried by a tank truck. Water is then pumped from the portable tank and played on the fire. The tank truck returns to a source of water for refilling in order to replenish the water in the portable tank. This operation continues until the fire is extinguished.

When the tank is no longer needed for fighting the fire, the residual water is dispensed by removing the rope 22 retaining spillway 24 in closed position, bottom 26 of spillway 24 drops to the ground and sides 27 and 28 assume the position shown in Fig. 3.

While the present invention has been shown and described in its preferred form, it is nevertheless to be understood that various changes may be made therein, within the scope of the claims hereto appended.

What I claim is:

1. A portable tank including a supporting frame, a flexible receptacle having a vertical wall detachably secured to said frame, a spillway normally constituting a section of the vertical wall of said flexible receptacle for emptying residual water from the receptacle, the spillway including outwardly extending sides, a bottom joining the sides, said sides being folded on a diagonal across the spillway entrance upon moving the bottom from open to closed position, and securing means adapted to engage and secure said spillway sides and bottom to said frame to normally retain the spillway in closed position.

2. A portable tank including a collapsible supporting frame, a flexible receptacle having a vertical wall detachably secured to and collapsible with said frame, a spillway constituting a section of the vertical wall of the flexible receptacle for emptying the residual water from the receptacle, the spillway including a pair of outwardly extending sides, a bottom joining said sides, spaced eyelets along a plurality of the sides' edges and along one edge of said bottom, said spillway sides being folded inwardly on a diagonal across the entrance of the spillway when the bottom is moved to closed position, to align the eyelets of the sides and bottom, and securing means adapted to pass through the eyelets and be wound about the frame to retain the spillway in closed position and prevent seepage of water therethrough.

3. A portable tank as set out in claim 2 wherein the spillway is formed from a single piece of flexible waterproof material folded to compose the spillway sides and bottom, each of said sides and bottom being of substantially the same area as the spillway entrance.

References Cited in the file of this patent

UNITED STATES PATENTS

| | | |
|---|---|---|
| 314,752 | Throckmorton | Mar. 31, 1885 |
| 1,307,942 | Volters | June 24, 1919 |
| 2,507,939 | Smith | May 16, 1950 |
| 2,567,514 | Hoffman | Sept. 11, 1951 |